United States Patent
Ströhle et al.

(10) Patent No.: US 6,723,459 B2
(45) Date of Patent: Apr. 20, 2004

(54) PLANT WITH HIGH TEMPERATURE FUEL CELLS

(75) Inventors: Werner Ströhle, Klaus (AT); Marco Nani, Sevelen (CH); Thomas Gamper, Trasadingen (CH)

(73) Assignee: Sulzer Hexis AG, Winterthur (CH)

( * ) Notice: Subject to any disclaimer, the term of this patent is extended or adjusted under 35 U.S.C. 154(b) by 113 days.

(21) Appl. No.: 09/877,664

(22) Filed: Jun. 8, 2001

(65) Prior Publication Data

US 2002/0006538 A1 Jan. 17, 2002

(30) Foreign Application Priority Data

Jul. 12, 2000 (EP) .............................. 00810611

(51) Int. Cl.[7] .............................................. H01M 8/04
(52) U.S. Cl. .......................................... 429/13; 429/26
(58) Field of Search ...................... 429/13, 26

(56) References Cited

U.S. PATENT DOCUMENTS

| | | | |
|---|---|---|---|
| 4,683,177 A | | 7/1987 | Kinoshita ..................... 429/26 |
| 5,312,699 A | * | 5/1994 | Yanagi et al. ............. 429/26 X |
| 5,335,628 A | * | 8/1994 | Dunbar ..................... 429/26 X |
| 5,605,770 A | * | 2/1997 | Andreoli et al. ........... 429/26 X |
| 5,900,329 A | * | 5/1999 | Reiter et al. .............. 429/26 X |
| 6,162,554 A | * | 12/2000 | Nölscher et al. .............. 429/13 |
| 6,368,737 B1 | * | 4/2002 | Margolit et al. .............. 429/26 |
| 6,391,485 B1 | * | 5/2002 | Perry ......................... 429/13 |

FOREIGN PATENT DOCUMENTS

| | | | |
|---|---|---|---|
| DE | 19948215 A1 | 4/2000 | |
| EP | 0814526 A1 | 12/1997 | ............ H01M/8/06 |
| EP | 0818840 A1 | 1/1998 | ............ H01M/8/04 |
| EP | 0568822 A2 | 11/1998 | ............ H02J/15/00 |
| EP | 0926755 A1 | 6/1999 | ............ H01M/8/04 |
| EP | 0977295 A1 | 2/2000 | ............ H01M/8/06 |
| JP | 01126137 | 5/1989 | ............ H02J/7/34 |
| JP | 01248478 | 10/1989 | ............ H01M/8/04 |
| JP | 08148166 | 6/1996 | ............ H01M/8/00 |
| JP | 11094044 | 4/1999 | ............ H01M/8/04 |
| WO | WO 94/18712 | 8/1994 | ............ H01M/8/04 |
| WO | WO 98/04011 A2 | 1/1998 | |

OTHER PUBLICATIONS

Patent Abstracts of Japan, vol. 1999, No. 09, Jul. 30, 1999 & JP 11 097044A (Matsushita Electric Works Ltd), Apr. 9, 1999 Abstract.

(List continued on next page.)

Primary Examiner—Stephen Kalafut
(74) Attorney, Agent, or Firm—Townsend and Townsend and Crew LLP

(57) ABSTRACT

The plant contains high temperature fuel cells which form a battery (1) in which electrochemical reactions can be carried out with a fuel (6) and a gas (5) containing oxygen while producing an electrical current (8) and a hot exhaust gas flow (7) which transports waste heat. The plant has a device with the following components:

- a circulation (2) with a heat carrier medium (20),
- a first heat exchanger (21) for the exhaust gas flow in which a portion of the waste heat can be transferred to the heat carrier medium,
- at the output of the heat exchanger (21) a discharge conduit for the exhaust gas flow which leads to a chimney (10), with it not being permitted for the exhaust gas temperature in the chimney to exceed a predetermined value, and
- at least one heat sink (22), in particular in the form of a further heat exchanger, in which the waste heat which is transferred to the heat carrier medium can be removed from the circulation at least partly as surplus heat when required, with it not being possible for the surplus heat to be used either for room heating (3) and/or utility water heating (3) or for another purpose (3).

14 Claims, 1 Drawing Sheet

OTHER PUBLICATIONS

Patent Abstracts of Japan, vol. 1996, No. 10, Oct. 31, 1996 & JP 08148166A (Mitsubushi Heavy Ind Ltd), Jun. 7, 1996 Abstract.

Patent Abstracts of Japan, vol. 013, No. 374 (E–808), Aug. 18, 1989 & JP 01126137 A (Osaka Gas Co Ltd), May 18, 1989, Abstract.

Patent Abstracts of Japan, vol. 013, No. 594 (E–867), Dec. 27, 1989 & JP 01248478 A (Hitachi Ltd), Oct. 4, 1989, Abstract.

Shibata, Kunio, "The Tokyo Electric Power Company (TEPCO) fuel cell evaluation program", *Journal of Power Sources,* 37(1992) Jan., Nos. 1/2, Lausanne, CH.

Lundberg, W.L. "Cogeneration Applications of a Natural Gas–Fueled SOFC Generator", *Proceedings of the Symposium on Fuel Cells,* US, Pennington, Electrochemical Society, vol. 6, Nov. 6, 1989, pp. 118–129, (month unknown).

Diethelm, R. et al., "Status of the Sulzer Hexis product development", Database Inspec 'Online! Institute of Electrical Engineers, Stevenage, GB, Abstract & International Conference with Exhibition. FUEL CELL 2000. Proceedings, Proceedings of International Conference. FUEL CELL 2000. Fuel Cell Products and Applications, Lucern, Switzerland, Jul. 10–14, 2000.

Krumpelt, M. et al., "Systems Analysis for High–Temperature Fuel Cells", *Extended Abstracts,* US, Electrochemical Society. Princeton, New Jersey, vol. 87–2, Oct. 18, 1987, pp. 261.

Diethelm et al., "Status of the Sulzer Hexis product development", *Proceedings of the International Conference, Fuel Cell 2000,* Lucern, Switzerland, Jul. 10–14, 2000, XP001034720.

Drenckhahn et al., "Technische und wirtschaftliche Aspekte des Brennstoffzelleneinsatzes in Krafft–Wärme–Kopplungsanlagen", *VGB Krafftwerkstechnik* GMBH Essen, DE, Bd. 71, Nr. 4, Apr. 1, 1991, XP000217446.

Yoshida et al., "Conceptual Design of 200 kW Town Gas Reformed Molten Carbonate Fuel Cell Cogeneration Plant", *International Journal of Hydrogen Energy,* vol. 13 No. 10, pp. 625–632, 1988.

\* cited by examiner

PLANT WITH HIGH TEMPERATURE FUEL CELLS

BACKGROUND OF THE INVENTION

The invention relates to a plant with high temperature fuel cells and to methods for operating the plant.

High temperature fuel cells, for example of the SOFC type ("Solid Oxide Fuel Cell"), enable an exploitation of the energy which is converted by the fuel cells in the operation of a building infrastructure. In this both the electrical energy which is produced as a result of electrochemical processes and the thermal energy which arises in the form of hot exhaust gases of the processes are used. If the building infrastructure is provided for a climate in which the weather conditions, in particular the ambient temperatures, vary in a marked fashion, then it is necessary at times to give off surplus heat to the surroundings. If fuel cells of the SOFC type are used, then the temperature of the exhaust gas is so high that the exhaust gas must not be expelled directly via a chimney into the surroundings in order to eliminate surplus heat. At these high temperatures, damage to the chimney could result; the hot exhaust gas would also be a source of danger for the environment.

Plants for the simultaneous production of electrical and thermal energy are known from EP-A 0 823 742. In these plants a surplus amount of heat which arises with the exhaust gases can be utilized by means of thermal engines. Possibilities of use of this kind are however often complicated and expensive, so that it is economically more advantageous to eliminate surplus heat in that it is emitted unused to the surroundings—"disposed of".

SUMMARY OF THE INVENTION

It is an object of the invention to create a plant with high temperature fuel cells which permits the electrical and thermal energy requirement of a building infrastructure to be covered and the surplus heat which arises from time to time to be emitted to the surroundings without parts of the building infrastructure being damaged or the environment being endangered.

The plant contains high temperature fuel cells which form a battery in which electrochemical reactions can be carried out with a fuel and a gas containing oxygen while producing an electrical current and a hot exhaust gas flow which transports waste heat. The plant comprises a device with the following components:

- a circulation with a heat carrier medium,
- a first heat exchanger for the exhaust gas flow in which a portion of the waste heat can be transferred to the heat carrier medium,
- at the output of the heat exchanger a discharge conduit for the exhaust gas flow which leads to a chimney, with it not being permitted for the exhaust gas temperature in the chimney to exceed a predetermined value, and
- at least one heat sink, in particular in the form of a further heat exchanger, in which the waste heat which is transferred to the heat carrier medium can be removed from the circulation at least partly as surplus heat when required, with it not being possible for the surplus heat to be used either for room heating and/or utility water heating or for another useful purpose.

In the following the invention will be explained with reference to the drawing.

DESCRIPTION OF THE PREFERRED EMBODIMENTS

Figure 1:
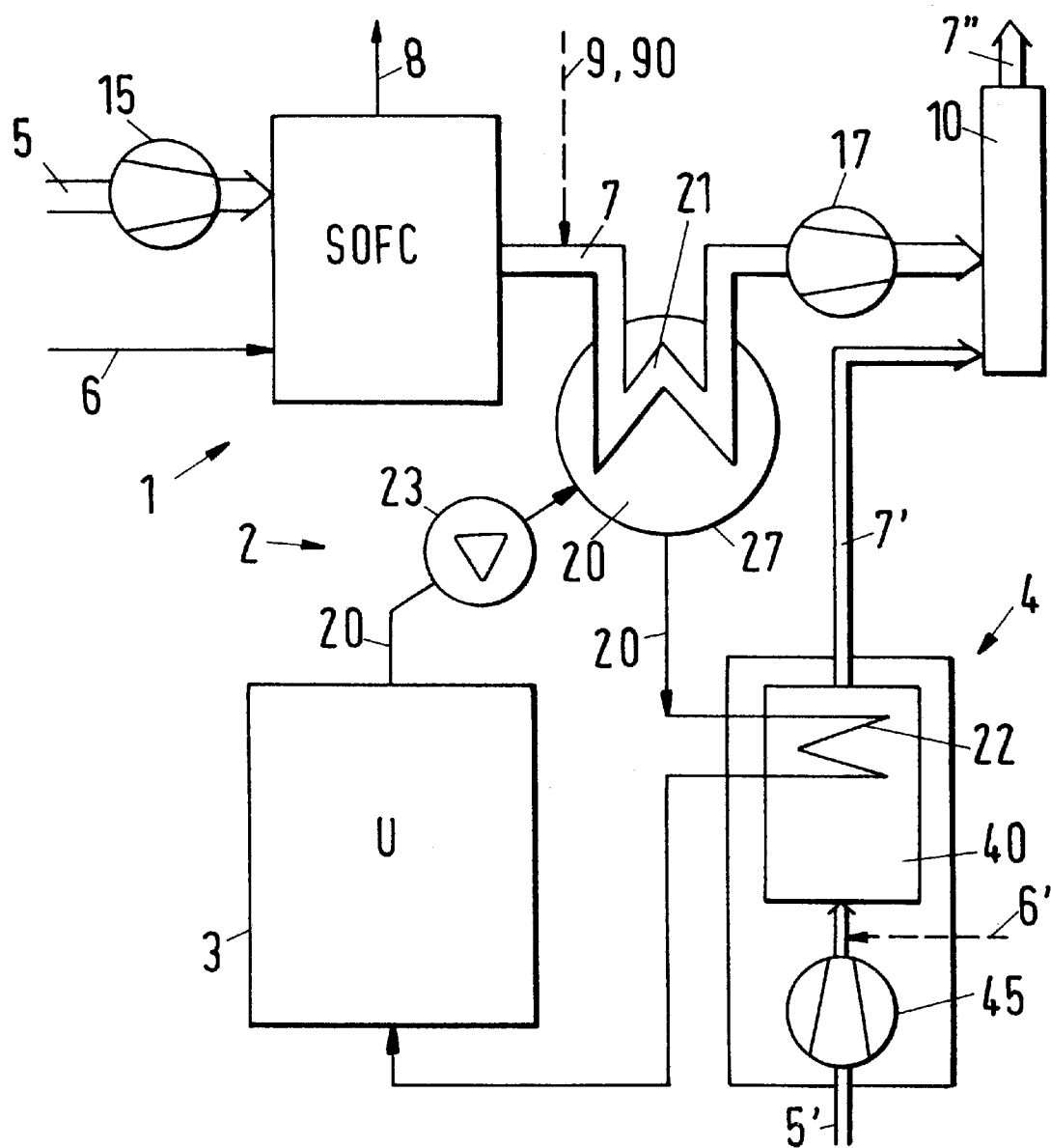
FIG. 1 schematically shows a plant constructed in accordance with the invention.

The plant of the invention comprises a fuel cell battery 1 with cells for example of the SOFC type, a circulation 2 with a heat carrier medium 20, devices 3 for emitting heat to a consumer U, a heating device 4 for a partial covering of a greater than average requirement of heat for heating, and a chimney 10, through which exhaust gases 7" can be emitted to the surroundings, with it being necessary for the condition to be fulfilled that the exhaust gas temperature in the chimney 10 does not exceed a predetermined value (250° C. or 160° C. for chimneys of aluminum or plastic respectively). A gas 5 containing oxygen, in particular ambient air, is fed into the battery 1 with a blower 15 and/or 17. There the gas 5 and a fuel 6 form the reactants of electrochemical processes, through which an electrical current 8 is produced. Waste heat which is produced at the same time is transported out of the battery 1 with a hot exhaust gas flow 7. Both blowers 15 and 17 are drawn in in the schematic plant diagram of FIG. 1; one of them can be dispensed with. As a rule only one of the two is used, with a compression operation resulting with the blower 15, a suction operation with the blower 17.

The devices 3 for the emitting of heat to a consumer U comprise for example radiators for room heating and/or a heat exchanger for a utility water heater.

A portion of the waste heat is transferred in a first heat exchanger 21 of the circulation 2 from the exhaust gas flow 7 to the heat carrier medium 20. The cooled down exhaust gas 7 is conveyed into the chimney 10. In the circulation 2 a circulation pump 23 conveys the heat carrier medium 20 into a further heat exchanger 22, which can be used as a heat sink in the presence of surplus heat which is to be eliminated. Instead of the circulation pump 23 which is indicated in FIG. 1 a second or sole circulation pump can also be used which is a component of the heating device 4.

The surplus heat cannot be used, as is assumed, either for room heating and/or utility water heating or for another purpose. The heat exchanger 22 and a blower 45 form parts of the heating device 4. The surplus heat can be transferred to an air flow 5' which is conveyed through the blower 45, can be further transported into the chimney 10 or also into a second, non-illustrated chimney and from there emitted ("disposed of") into the surroundings. The air flow 5' must be strong enough so that it enters chimney 10 at a sufficiently low temperature.

In relation to the direction of the air flow 5' the heat exchanger 22 is arranged downstream in a combustion chamber 40. In this chamber 40 a fuel 6' is burned in the air flow 5' during the heating operation to form an exhaust gas 7', and combustion heat which arises therein is emitted to the heat exchanger 22. A heating operation of this kind is necessary only at times when no surplus heat is to be eliminated, so that the situation never arises that the heat exchanger 22 would have to be used at the same time for emitting heat to the air flow 5' and a taking up of heat from the exhaust gas 7'.

An infeed 9 which opens into the exhaust gas flow 7 and through which a medium 90 which reduces the exhaust gas temperature can be supplied can be provided ahead of the first heat exchanger 21. The surplus heat or a portion thereof can be conveyed into the chimney 10 by means of the exhaust gas flow in which the medium 90 is contained. The medium 90 is e.g. ambient air, by means of which the temperature is lowered through admixing, or water, which vaporizes in the exhaust gas flow 7 and in so doing causes a lowering of the temperature.

The first heat exchanger 21 is arranged in a container 27 which can be used as a heat storage. The heat carrier medium 20, preferably water, serves in this as a storage medium.

Further heat exchangers are arranged in the circulation 2 and, as already mentioned, are used for the purpose of room heating and/or utility water heating. A use by a further heat consumer can also be provided, for example through a cooling aggregate which is used as an absorption heat pump (cf. the above-named EP-A 0 823 742).

The plant in accordance with the invention forms a part of a building infrastructure. The infrastructure can be operated in isolation from an external electric power supply ("island operation"), with the electrical energy requirement to be anticipated in the building being completely covered by the fuel cell battery 1 of the plant. Surplus waste heat can be discharged with this plant to the surroundings of the building without parts of the infrastructure being damaged or the environment being endangered thereby. In the event of a lack of waste heat the heat which is additionally required for heating purposes is produced by means of the heating device 4.

A building containing the plant in accordance with the invention can also be connected to an external electric power supply. This external electric power supply can be used as a buffer with respect to temporarily surplus or lacking electrical energy respectively. It can also be provided that the electrical energy requirement 8 which is to be anticipated on the average over the year is covered by the fuel cell battery 1 of the plant. In this case, if a strong deviation from the average does not arise, the yearly balance with respect to the exchange of electrical energy is largely equable.

A surplus waste heat which arises in the plant in accordance with the invention can also be discharged out of the plant, for example into a sewage train, by means of heated utility water. This method is to be considered as an emergency solution; it can be used as an additional possibility if a waste heat disposal by means of the above-described methods is not sufficient.

What is claimed is:

1. A plant comprising high temperature fuel cells which form a battery in which electrochemical reactions are carried out with a fuel and a gas including oxygen while producing an electrical current and hot exhaust gas which transports waste heat, the plant comprising a device including a circulation system in which a heat carrier medium flows; a first heat exchanger for transferring waste heat from the exhaust gas to the heat carrier medium resulting in a heated heat carrier medium furnishing heat to a user device capable of using a limited amount of heat while cooling the exhaust gas not to exceed a predetermined temperature so that the exhaust gas can be discharged without causing damage; and a second heat exchanger for removing heat from the heat carrier medium to regulate the amount of heat furnished to the user device not to exceed the limited amount of heat, the second heat exchanger transferring heat removed from the heat carrier medium to a secondary gas flow that can be discharged without causing damage.

2. A plant according to claim 1 including a chimney downstream of the first and second heat exchangers into which the cooled exhaust gas and the secondary gas are discharged.

3. A plant according to claim 1 including a blower for air which produces the secondary gas flow.

4. A plant according to claim 1 wherein the second heat exchanger additionally is provided for transferring heat to the first heat carrier medium when the heat transferred by the first heat exchanger to the first heat carrier medium is less than the limited amount of heat, and including a chamber operatively coupled to the second heat exchanger for combusting a fuel therein to heat the heat carrier medium sufficiently to provide the user device with the limited amount of heat.

5. A plant according to claim 4 including a conduit for flowing the secondary gas flow and combustion products produced in the chamber to the chimney.

6. A plant according to claim 1 including a conduit receiving the exhaust gas from the fuel cells, and an infeed device in fluid communication with the conduit upstream of the first heat exchanger for flowing a cooling medium into the exhaust gas to thereby lower the temperature of the exhaust gas.

7. A plant according to claim 1 including a storage container in which the first heat exchanger is arranged and which holds the carrier medium so that the heat carrier medium is useable as a heat storage medium.

8. A plant according to claim 1 including at least one further heat exchanger operatively coupled to the circulation system for heating at least one of a space, a water heater and a cooling aggregate used as an absorption heat pump.

9. A method of providing a building with electrical energy and heat, the method comprising generating the electrical energy with high temperature fuel cells which form a battery in which electrochemical reactions are carried out with a fuel and gas including oxygen and which generates a hot exhaust gas that transports waste heat, flowing the exhaust gas through a first heat exchanger, in the first heat exchanger transferring waste heat from the exhaust gas to a heat carrier medium flowing in a circulation system to thereby heat the heat carrier medium for furnishing heat to a user device capable of using a limited amount of heat and cooling the exhaust gas not to exceed a predetermined temperature for discharging it without causing damage, and removing excess heat from the heat carrier medium in a second heat exchanger to limit the amount of heat furnished to the user device so that it does not exceed the limited amount, and transferring heat removed from the heat carrier medium in the second heat exchanger to a secondary gas flow that is discharged.

10. A method according to claim 9 including a heater associated with the second heat exchanger for heating the second heat carrier medium when the second heat exchanger transfers insufficient heat from the exhaust gas to the heat carrier medium to provide the user device with the limited amount of heat.

11. A method according to claim 9 wherein the building includes an external electric power supply, and including using the external electric power supply as a source of additional electrical energy when the electrical energy generated by the fuel cells is insufficient for the requirements of the building, and for supplying excess electrical energy generated by the fuel cell to the external electric power supply.

12. A method according to claim 11 including determining an average amount of electrical energy required by the building, and providing a number of fuel cell batteries sufficient to supply the building with its average electrical energy requirement.

13. A method according to claim 9 including discharging the cooled exhaust gas to an exterior of the building.

14. A method according to claim 13 wherein discharging comprises transferring the excess heat carried by the cooled exhaust gas to water and thereafter discharging the water into a sewage drain.

* * * * *